3,196,113
REMOVAL OF FLUX FROM BRAZED
ALUMINUM ASSEMBLIES
Basil M. Ponchel, Cleveland, Ohio, assignor to Aluminum Company of America, Pittsburgh, Pa., a corporation of Pennsylvania
No Drawing. Filed Nov. 9, 1962, Ser. No. 236,706
7 Claims. (Cl. 252—101)

This invention relates to a method of removing flux residues from aluminum assemblies, particularly removing chloride-fluoride containing fluxes clinging to brazed aluminum assemblies. As used herein the word aluminum includes high purity aluminum, aluminum in various commercial grades and aluminum base alloys.

Fluxes commonly used in welding and brazing aluminum contain chlorides and fluorides. These chemicals can cause corrosion if they are allowed to remain on the joined assembly. It is, therefore, commonly recognized that it is essential to clean the assemblies after joining to remove these fluxes. Cleaning the assemblies in water followed by an acid treatment is usually used. The acid solutions commonly used in such treatments are: nitric acid, nitric acid-hydrofluoric acid, hydrofluoric acid, nitric acid-dichromate, and phosphoric acid-chromium trioxide. The nitric acid solution is used as a general-purpose treatment. The nitric-hydrofluoric solution can be employed to obtain a uniform etch and to remove flux in a single operation, however, it must be used for a very short time to limit the amount of etching. Hydrofluoric acid solutions will react with the aluminum, therefore, the time of employment of these solutions should be short. Nitric acid-dichromate solutions are useful where some residual resistance to corrosion is desired but such solutions will not tolerate substantial contamination with flux salts without becoming corrosive in themselves. Also, the disposal of these nitric-chromate solutions may be a problem. A solution of phosphoric acid and chromium trioxide is useful where flux removal is not too difficult, however, disposal of this solution may also be a problem.

A problem has been encountered in the removal of flux from thin gage brazed aluminum assemblies, since seeper leaks sporadically develop in such assemblies. Seeper leaks are perforations which are found to result from intergranular attack initiated during the flux removal operation. The problem is particularly acute in the case of thin aluminous metal members, around .010 to .020 inch thick, but the problem is not confined to such thin members. Further, while seeper leaks may sometimes be observed during and shortly after the flux removal operations, in many cases they develop later, during storage or use of the joined assemblies. The development of seeper leaks in brazed aluminum assemblies appears to be related to the composition of the flux removal solutions, the degree of flux contamination in the solution, and sometimes the amount of residual flux on the aluminum surface. Commonly used flux removal solutions, which have substantial flux contamination, have been found to promote intergranular attack on the aluminum.

An object of this invention is to provide a flux removal procedure for use on joined aluminum assemblies that will minimize the occurrence of seeper leaks. In particular an object is to provide a solution for use in flux removal operations having a high flux tolerance thereby substantially prolonging the useful life of the solution without initiation and promotion of intergranular attack on aluminous metal members of brazed aluminum assemblies.

In accordance with the invention, as with prior flux removal procedures, as much of the chloride-fluoride containing flux as possible should be rinsed off the joined aluminum assemblies with hot water, preferably boiling water. However, it is almost impossible to remove all of the chloride-fluoride containing flux clinging to brazed aluminum assemblies by rinsing with water. It has been found that residual flux clinging to aluminous metal members of brazed assemblies, which remains after rinsing with water, may be effectively removed by immersing the assemblies in an aqueous acid solution that will remove the residual flux and prevent any appreciable attack on the aluminum. The aqueous acid solution should contain as its essential components, in addition to water, nitric acid and at least one organic compound selected from the group consisting of thiourea, triethanolamine salt of laurylsulfobenzoic acid, nicotine sulfate, and hexamethylenetetramine.

This aqueous acid solution should contain 5 to 40%, by weight, nitric acid and a lesser amount of organic compound but at least 0.05%, by weight. While the maximum amount of organic compound is not critical, more than 2%, by weight, does not give any appreciable increase in effectiveness. Satisfactory results have been obtained with 1%, by weight, of organic compound. The solution may be used at room temperature and the immersion period should be long enough to remove the flux residue from the brazed assemblies. The immersion period should be 5 to 20 minutes and 10 to 15 minutes is typical. Generally, the period of immersion will depend upon how well the flux is removed in the initial hot water cleaning. The more satisfactorily the flux is removed the shorter the immersion period required. After the joined assemblies are removed from the aqueous acid solution, they should again be rinsed with water.

A number of tests were made to determine the effectiveness of the above-mentioned organic compounds in raising the flux tolerance in a nitric acid solution when used for removing flux residues after a brazing operation to prevent seeper leaks from developing in the brazed assemblies.

The tests simulated a flux removal procedure in which good flux removal with water is obtained prior to cleaning in a flux removal solution. The nitric acid concentration of the solutions used in the tests is typically employed in cleaning brazed aluminum assemblies. Aluminum samples of 0.012 inch thickness were immersed in either aqueous acid solutions containing 10% by weight, nitric acid and various amounts of dissolved flux or aqueous acid solutions containing 10%, by weight, of nitric acid, 1%, by weight, of organic compound, and various amounts of dissolved flux. The particular flux dissolved in all of these solutions was a commercially available flux, designated Alcoa Brazing Flux No. 58, which contained both chloride and fluoride salts. After the samples were immersed in the respective solutions for 15 minutes they were withdrawn, rinsed in tap water, and then immersed in tap water for three days. Upon inspection of these samples at the end of three days it was found that seeper leaks had developed when the flux contamination, conveniently measured by the amount of chloride expressed as sodium chloride, in the aqueous nitric acid solutions not containing any additive, reached 5 g./liter.

Samples subjected to the aqueous nitric acid solutions containing 1.0%, by weight, of either thiourea or triethanolamine salt of laurylsulfobenzoic acid, did not develop seeper leaks until the flux contamination, conveniently measured by the amount of chloride expressed as sodium chloride, reached 50 g./liter.

Samples subjected to the aqueous nitric acid solutions containing 1% by weight, of either nicotine sulfate or hexamethylenetetramine, did not develop any seeper leaks until the flux contamination reached about 25 g./liter.

What is claimed is:

1. The process of removing a chloride-fluoride containing flux from joined aluminous metal members comprising, removing flux residues from the brazed assembly by immersing the brazed assembly in an aqueous acid solution consisting essentially of water, 5–40%, by weight, nitric acid and a lesser amount but at least 0.05%, by weight, of at least one organic compound selected from the group consisting of thiourea, triethanolamine salt of laurylsulfobenzoic acid, nicotine sulfate, and hexamethylenetetramine.

2. The process of removing a chloride-fluoride containing flux from joined aluminous metal members comprising, removing flux residues from the brazed assembly by immersing the brazed assembly in an aqueous acid solution consisting essentially of water, 5–40%, by weight, nitric acid and 0.05%–2.0%, by weight, of at least one organic compound selected from the group consisting of thiourea, triethanolamine salt of laurylsulfobenzoic acid, nicotine sulfate, and hexamethylenetetramine.

3. The process of removing a chloride-fluoride containing flux from joined aluminous metal members comprising, removing flux residues from the brazed assembly by immersing the brazed assembly in an aqueous acid solution for 5 to 20 minutes, said solution consisting essentially of water, 5–40%, by weight, nitric acid and 0.05%–2.0%, by weight, of at least one organic compound selected from the group consisting of thiourea, triethanolamine salt of laurylsulfobenzoic acid, nicotine sulfate, and hexamethylenetetramine.

4. The process of removing a chloride-fluoride containing flux from joined aluminous metal members comprising, removing flux residues from the brazed assembly by immersing the brazed assembly in an aqueous acid solution consisting essentially of water, 5–40%, by weight, nitric acid and a lesser amount but at least 0.05%, by weight, of thiourea.

5. The process of removing a chloride-fluoride containing flux from joined aluminous metal members comprising, removing flux residues from the brazed assembly by immersing the brazed assembly in an aqueous acid solution consisting essentially of water, 5–40%, by weight, nitric acid and a lesser amount but at least 0.05%, by weight, of triethanolamine salt of laurylsulfobenzoic acid.

6. The process of removing a chloride-fluoride containing flux from joined aluminous metal members comprising, removing flux residues from the brazed assembly by immersing the brazed assembly in an aqueous acid solution consisting essentially of water, 5–40%, by weight, nitric acid and a lesser amount but at least 0.05%, by weight, of nicotine sulfate.

7. The process of removing a chloride-fluoride containing flux from joined aluminous metal members comprising, removing flux residues from the brazed assembly by immersing the brazed assembly in an aqueous acid solution consisting essentially of water, 5–40%, by weight, nitric acid and a lesser amount but at least 0.05%, by weight, of hexamethylenetetramine.

References Cited by the Examiner

UNITED STATES PATENTS

| | | | |
|---|---|---|---|
| 1,719,168 | 7/29 | Chamberlain | 134—41 |
| 2,683,736 | 7/54 | Kosmin | 252—355 XR |
| 2,756,131 | 7/56 | Neunzig | 252—101 XR |
| 2,947,703 | 8/60 | Larsonneur | 252—391 XR |
| 3,074,824 | 1/63 | Binger et al. | 134—28 |

FOREIGN PATENTS 458,163  12/36  Great Britain.

ALBERT T. MEYERS, *Primary Examiner.*
JULIUS GREENWALD, *Examiner.*